United States Patent
Krishnamoorti et al.

(10) Patent No.: US 7,893,148 B2
(45) Date of Patent: Feb. 22, 2011

(54) NANOCOMPOSITES OF POLYMERS WITH DISPERSED NANOTUBES

(75) Inventors: Ramanan Krishnamoorti, Bellaire, TX (US); Tirtha Chatterjee, Jalpaiguri (IN); Koray Yurekli, Istanbul (TR)

(73) Assignee: University of Houston, Houston, TX (US)

( * ) Notice: Subject to any disclaimer, the term of this patent is extended or adjusted under 35 U.S.C. 154(b) by 4 days.

(21) Appl. No.: 12/064,660

(22) PCT Filed: Aug. 24, 2006

(86) PCT No.: PCT/US2006/033061
§ 371 (c)(1),
(2), (4) Date: Feb. 3, 2009

(87) PCT Pub. No.: WO2007/025035
PCT Pub. Date: Mar. 1, 2007

(65) Prior Publication Data
US 2009/0221738 A1  Sep. 3, 2009

Related U.S. Application Data

(60) Provisional application No. 60/710,837, filed on Aug. 24, 2005.

(51) Int. Cl.
*B60C 1/00* (2006.01)
*C08K 3/04* (2006.01)
*C08K 5/19* (2006.01)
*C08K 5/41* (2006.01)
*C08K 9/00* (2006.01)
*B01D 12/00* (2006.01)
*B01F 17/00* (2006.01)

(52) U.S. Cl. .................. 524/496; 523/215; 524/156; 516/200

(58) Field of Classification Search .......... 524/495, 524/496; 523/215
See application file for complete search history.

(56) References Cited

U.S. PATENT DOCUMENTS

| | | | |
|---|---|---|---|
| 2002/0048632 | A1 | 4/2002 | Smalley et al. |
| 2003/0122111 | A1 | 7/2003 | Glatkowski |
| 2003/0153965 | A1 | 8/2003 | Supronowicz et al. |
| 2009/0030090 | A1* | 1/2009 | Krishnamoorti et al. . 514/772.4 |

FOREIGN PATENT DOCUMENTS

| | | |
|---|---|---|
| EP | 1 466 940 A1 | 10/2004 |
| EP | 1 500 677 A2 | 1/2005 |
| WO | WO 2004/097853 A1 | 11/2004 |
| WO | WO 2005/014708 A1 | 2/2005 |

OTHER PUBLICATIONS

Geng. H., Rosen, R., Zheng, B. Shimoda, H., Fleming, L., Zhou, O. "Fabrication and Properties of Composites of Poly(ethylene oxide) and Functionalized Carbon Nanotubes." Advanced Materials, vol. 14(19), p. 1387-1390, Oct. 2, 2002.*
Hilding, J., Grulke, E.A., Zhange, Z.G., Lockwood, F. "Dispersion of Carbon Nanotubes." Journal of Dispersion Science and Technology, vol. 24(1), p. 1-41, 2003.*
Wang, G., Olofsson, G. J. Phys. Chem. B, vol. 102, p. 9276-9283, 1998.*
Chatterjee, T., Yurekli, K., Hadjiev, V.G., Krishnamoorti, R. Adv. Func. Mater., vol. 15, p. 1832, 2005.*
Krstic, V., Duesberg, G.S., Muster, J., Burghard, M., Roth, S. Chem. Mater., vol. 10, 2338-2340, 1998.*
Parmpi, P., Kofinas, P. Biomaterials, vol. 25, No. 10, p. 1969-1973, May 2004.*
Journet, C. Maser, W.K., Bernier, P., Loiseau, A., de la Chapelle. M. L., Deniard, P., Lee, R., Fischer, J.E. Nature, vol. 388, p. 756-758, 1998.*
Sano, M., Kamino, A., Okamura, J. Shinkai, S. Langmuir, vol. 17, No. 17, p. 5125-5128, 2001.*
European Patent Office communication pursuant to Article 94(3) EPC, application No. 06802252.4, Jan. 13, 2009.
Response to European Patent Office communication pursuant to Article 94(3) EPC, application No. 06802252.4, May 15, 2009.
Iijima, et al., "Helical Microtubules of Graphitic Carbon," Nature, vol. 354, pp. 56-58, 1991.
Iijima, et al., "Single-shell carbon nanotubes of 1-nm diameter," Nature, vol. 363, pp. 603-605, 1993.
Bethune, et al., "Cobalt-catalyzed growth of carbon nanotubes with single-atomic-layer walls," Nature, vol. 363, pp. 605-607, 1993.
Barraza, et al., "SWNT-Filled Thermoplastic and Elastomeric Composites Prepared by Miniemulsion Polymerization," Nanoletters, vol. 2, pp. 797-802, 2002.
Ausman, et al., "Organic Solvent Dispersions of Single-Walled Carbon Nanotubes: Toward Solutions of Pristine Nanotubes," J. Phys. Chem., vol. 104, pp. 8911-8914, 2000.
Bronikowski, et al., "Gas-phase production of carbon single-walled nanotubes from carbon monoxide via the HIPco process: a parametric study," J. Vac. Sci. Technol. A., vol. 19, pp. 1800-1805, 2001.
Du, et al., "Coagulation Method for Preparing Single-Walled Carbon Nanotube/Poly(methyl methacrylate) Composites and Their Modulus, Electrical Conductivity, and Thermal Stability," J. Polymer Sci. B, vol. 41, pp. 3333-3338, 2003.
Garboczi, et al., "Geometrical percolation threshold of overlapping ellipsoids," Phys. Rev. E, vol. 52, pp. 819-828, 1995.

(Continued)

*Primary Examiner*—Vasu Jagannathan
*Assistant Examiner*—Anthony H Sheh
(74) *Attorney, Agent, or Firm*—Winstead PC

(57) ABSTRACT

The present invention provides polymer nanocomposites with dispersed nanotubes and methods of making same. The polymer may be a polyether. For example, the present invention provides an effective method to successfully disperse single walled nanotubes (SWNTs) into both Polyethylenoxide (PEO) and its low molecular weight analog polyethylene glycol (PEG) with hydrodynamic percolation at about 0.09 wt % and an electrical percolation at about 0.03 wt % SWNTs at room temperature, and the resulting nanocomposites. The method may include providing a surfactant. Most notably the present inventors achieved a decrease in the melting point of the polymer and a retardation of polymer crystallization due to the presence of the nanotubes.

12 Claims, 7 Drawing Sheets

OTHER PUBLICATIONS

Guth, "Theory of Filler Reinforcement," J. App. Phys., vol. 16, pp. 20-25, 1945.

Probst, et al., "Nucleation of polyvinyl alcohol crystallization by single-walled carbon nanotubes," Polymer, vol. 45, pp. 4437-4443, 2004.

Rao, et al., "Effect of van der Waals Interactions on the Raman Modes in Single Walled Carbon Nanotubes," Phys. Rev. Lett., vol. 86, pp. 3895-3898, 2001.

O'Connell, et al., "Near-infrared resonance Raman excitation profile studies of single-walled carbon nanotube intertube interactions: A direct comparison of bundled and individually dispersed HiPco nanotubes," Phys. Rev. B, vol. 69, pp. 235415-235429, 2004.

Hadjiev, et al., "Thermal mismatch strains in sidewall functionalized carbon nanotube/polystyrene nanocomposites," J. Chem. Phys., vol. 122, pp. 124708-124713, 2005.

Kuppa, et al., "Dynamics of poly(ethylene oxide) in nanoscale confinements: A computer simulations perspective," J. Chem. Phys., vol. 118, pp. 3421-3429, 2003.

* cited by examiner

NANOCOMPOSITES OF POLYMERS WITH DISPERSED NANOTUBES

CROSS REFERENCE TO RELATED APPLICATIONS

This application for patent claims priority to U.S. Provisional Patent Application Ser. No. 60/710,837, filed Aug. 24, 2005.

BACKGROUND OF THE INVENTION

1. Field of the Invention

The present invention relates generally to nanocomposites of polymers with dispersed nanotubes and methods of making them. More specifically, the present invention relates to the dispersal of single walled nanotubes (SWNTs) into polyethers, such as polyethylene oxide (PEO) and its low molecular weight analog polyethylene glycol (PEG), still more particularly with geometrical percolation at about 0.09 wt. % SWNT and an electrical percolation at about 0.03 wt. % SWNT at room temperature.

2. Description of the Background Art

Carbon nanotubes (CNTs), including multiple concentric shells and termed multi-walled carbon nanotubes (MWNTs), were discovered by Iijima in 1991 (Iijima, *Nature*, 1991, 354, 56). Subsequent to this discovery, single-walled carbon nanotubes (SWNTs), including a single graphene rolled up on itself, were synthesized in an arc-discharge process using carbon electrodes doped with transition metals (Iijima et al., *Nature*, 1993, 363, 603; and Bethune et al., *Nature*, 1993, 363, 605).

The extraordinary mechanical, electrical and thermal properties of nanotubes make them outstanding materials to blend with polymers to prepare potentially multifunctional nanocomposites. However, development of polymer nanocomposites with dispersed carbon nanotubes has tended to be stymied by the lack of dispersion of the nanotubes, due to their strong inter-tube interactions.

Thus, investigations of polymer nanocomposites with dispersed carbon nanotubes and methods of preparing them have been ongoing. Because nanotubes are largely chemically inert, it has not been expected that chemical methods of dispersion would be successful. Successful methods of dispersion have tended to involve mechanical agitation. Reports of investigations include: F. Du, et al., J. Polymer Sci. B 41, 3333-3338 (2003); H. J. Barraza, et al. Nanoletters 2, 797-802 (2002); K. D. Ausman, et al. J. Phys. Chem. 104, 8911-8915 (200); and O. Probst, et al. Polymer 45, 4437-4443 (2004).

Notwithstanding the above teachings, there remains a need for composites of polymers with dispersed nanotubes exhibiting desirable properties and method of making the composites.

BRIEF DESCRIPTION OF THE INVENTION

The present invention provides a composite containing a polymer and dispersed nanotubes, the composite having desirable properties. The composite may contain a surfactant. The present invention further provides methods of making composites that include dispersing nanotubes in a polymer matrix. The methods may further include the use of a surfactant.

Thus, a composite may include a matrix that includes a polymer and a plurality of nanotubes dispersed in the matrix. The polymer may be a biocompatible polymer. The polymer may be a water soluble polymer. The polymer may be a polyether. The polyether may be selected from the group consisting of polyethylene oxide and polyethylene glycol. The dispersion aid may be an anionic surfactant. The dispersion aid may contain lithium. Each nanotube may be single-walled. The plurality of nanotubes may be well dispersed. The nanocomposite may include a dispersion aid. The dispersion aid may be selected from the group consisting of amphiphilic surfactants and block copolymers. The dispersion aid may contain a dodecyl saturated carbon chain.

The composite may exhibit desirable properties. The composite may contain a concentration of the plurality of nanotubes in the polymer which is at least that associated with an electrical percolation threshold. The composite may contain a concentration of the plurality of nanotubes in the polymer which is at least that associated with a geometric percolation threshold. The composite may be well homogenized. The composite may have a conductivity that is greater than that of the polymer. The composite may have a melting point of the composite is less than that of the polymer. The composite may have a rate of crystallization less than that of the polymer.

Each of the above-described features may be practiced singly or in combination.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following brief descriptions taken in conjunction with the accompanying drawings, in which.

DETAILED DESCRIPTION OF INVENTION

Figure 1:
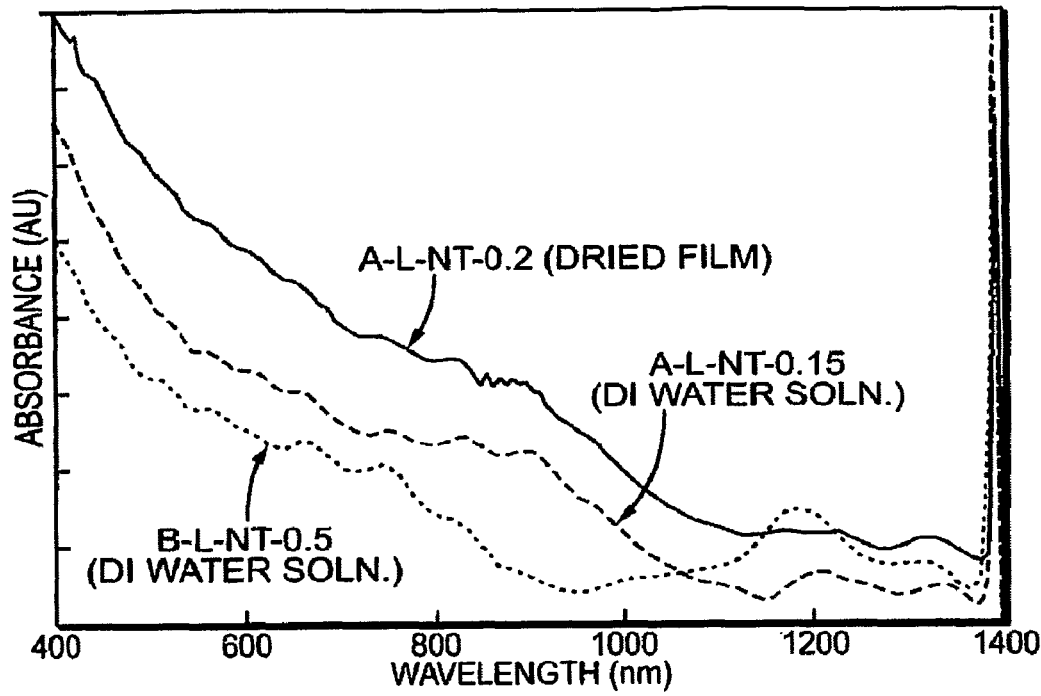
FIG. 1 shows plots of absorption spectra illustrating exemplary nanocomposites exhibiting well dispersed nanotubes.

The present inventors have demonstrated the dispersion of nanotubes in a polymer matrix. For example, the present inventors have demonstrated the dispersion of single walled carbon nanotubes (SWNTs) in poly (ethylene oxide) (PEO), a water soluble, biocompatible polymer that has found applications in a variety of technologies including as electrolytes.

The present inventors have used the ability of nanotubes to be dispersed with the aid of small quantities of amphiphilic surfactants or block copolymers to help obtain dispersion of nanotubes in polymer matrices. For example, the present inventors have developed an effective method to successfully disperse single walled nanotubes (SWNTs) into both polyethylene oxide (PEO) and its low molecular weight analog polyethylene glycol (PEG) with geometric percolation at ~0.09% and an electrical percolation at ~0.03% SWNTs at room temperature using a lithium-based anionic surfactant as a compatibilizer.

Lithium has the ability to intercalate between nanotubes. Surfactants such as sodium dodecyl sulfate (SDS) have the ability to individualize and disperse nanotubes in water. The complexation of lithium by polyethylene oxide is known.

In preparing the nanocomposites containing a lithium-based surfactant, the present inventors compatibilized pristine SWNTs and PEO with a lithium-based anionic surfactant that has a dodecyl saturated chain as the tail. The present inventors found that in preparing such nanocomposites the surfactant (lithium dodecyl sulfate (LDS)) de-ropes the nanotube bundles and that the PEO complex around the lithium develops a well homogenized nanocomposite.

The present inventors have demonstrated the development of nanocomposites with well dispersed SWNTs. The present inventors have further demonstrated the unique consequences of SWNTs dispersed with a lithium-based surfactant on the crystallization behavior of the polymer, as exemplified by PEO, contained in the nanocomposite. In particular, the present inventors achieved a decrease in the melting point of the polymer and a retardation of polymer crystallization due to the presence of the nanotubes. Further, Raman spectroscopy of the nanocomposites indicates that the nanotubes are subjected to tensile stress transfer from the polymer at room temperature.

The nanocomposite samples are denoted herein with a nomenclature 'X-Y-NT-Z', where 'X' denotes the polymer series (A is a low molecular weight with $M_w$=8000 Da and B is a high a molecular weight sample with $M_w$=100000 Da), 'Y' denotes the surfactant used (L for LDS, S for SDS and D for dodecyl trimethyl ammonium bromide (DTAB)), and 'Z' denotes the wt % of SWNTs dispersed in the polymer. On the other hand, reference samples are denoted only as 'X-Y-Z', indicating that the samples were prepared without nanotubes (NT) and only contain polymer and surfactant.

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

EXAMPLES

General Procedures

Preparation of Samples

The SWNTs used in this study are prepared by the Hipco method known to those of skill in the art (e.g., Bronikowski et al., *J. Vac. Sci. Technol. A.* 2001, 19, 1800) and purified using standard procedures. After purification, the metal content, measured via energy dispersive spectroscopy (EDS), was below 1 wt %. The polymers and surfactants used in this study were purchased from Aldrich Chemical Co. and used as received. All samples were prepared by first dispersing the SWNTs in deionized water with the aid of surfactant and assisted by sonication (Fisher Scientific ultrasonic bath, 44 kHz, 3 hours). The present inventors used two anionic surfactants, namely, lithium and sodium salts of dodecyl sulfate (LDS and SDS respectively) and a cationic surfactant dodecyl trimethyl ammonium bromide (DTAB). The molar ratio of surfactant head group to nanotube carbon was maintained at ~1:2 for all the samples. The polymer was subsequently added to this dispersion and the mixture stirred for 24 hours. The solvent was then removed by extensive drying under convective flow followed by vacuum drying in the melt state (80° C. for 24 h).

UV-Vis-Near IR Absorbance Spectra

UV-Vis-near IR measurements were performed using a Jasco V570 spectrophotometer over a wavelength range of 200 to 2000 μm. Solution spectra were obtained using a 1 mm path-length quartz cuvette. For the absorption spectra from thin polymer films, the samples were melt pressed to a thickness of ~200 μm and the spectra obtained on free standing films.

Melt Rheology: Dynamic Storage Modulus and Complex Viscosity

Melt-state dynamic oscillatory measurements were performed on a TA Instruments ARES rheometer with a torque transducer range of 0.2 to 2000 $g_f$-cm using 25 or 50 mm diameter parallel plates with a sample thickness of 1-2 mm. A small amplitude oscillatory strain γ(t) of the form $\gamma(t)=\gamma_0 \sin(\Omega t)$, where $\gamma_0$ is the strain amplitude, was applied. Values of $\gamma_0$ were kept as low as possible to apply a minimal deformation as well as not to change the quiescent state structure of the nanocomposites. The resulting time dependent linear shear stress, σ(t), was recorded and interpreted as, $\sigma(t)=\gamma_0[G' \sin(\Omega t)+G'' \cos(\Omega t)]$, where G' and G'' are the storage and loss modulus respectively. The other rheological properties reported include the complex modulus ($G^*=\sqrt{(G')^2+(G'')^2}$) and the complex viscosity ($\eta^*=G^*/\Omega$). Data were collected over a range of temperatures and mastercurves were generated using Boltzmann's time-temperature superposition principle.

DC Conductivity

The room temperature dc resistance (R) of the sample was measured using a four-point probe and converted to dc conductivity ($\sigma_{dc}$) using the relation $\sigma_{dc}=1/(R^*A)$, where l is the thickness of the thin film prepared through vacuum molding, R the measured dc resistance and A is the sample cross-sectional area. Typically the sample thickness varied from 0.6 mm to 0.9 mm for this study.

Raman Spectra

Raman spectra were recorded on a Jobin Yvon S3000 spectrometer. A long-working distance microscope objective (50×) on an Olympus 45 microscope was used to both focus the laser beam to a spot ≈2 μm in diameter on the sample surface and to collect the scattered light. The laser power density was kept below $10^4$ W/cm$^2$ to prevent overheating of the sample at the laser spot. Independence of the observed spectra to laser power was ensured to verify that the laser beam did not heat the samples excessively.

Calorimetry: Melting and Crystallization

Bulk differential scanning calorimetry (DSC) was performed in a PerkinElmer Pyris 1 DSC instrument with subambient capability. The sample weight was maintained at ~10 (±1) mg. Melting temperature ($T_m$), glass transition temperatures ($T_g$) and non-isothermal crystallization kinetics were measured using heating and cooling rates of 10° C./min. All reported $T_m$, $T_c$ and $T_g$ data were based on the second heating measurements. $T_g$ data reported here were calculated from the location of the midpoint of the jump in heat capacity ($\Delta C_P$) and the width assigned by the difference between the end points of the $\Delta C_P$ function. The melting and crystallization temperatures reported here represent the peak (endotherm or exotherm) temperature.

X-Ray Diffraction: Fractional Crystallinity

X-ray diffraction was conducted on a Siemens D5000 X-ray diffractometer with a CuK$_\alpha$ radiation of wavelength of 1.54 Å. The radiation was generated at 40 mA and 30 kV. Diffraction spectra were recorded for a 2θ range from 2° to 50°, in steps of 0.01° with a counting time of 1 s at each angular position.

Example 1

Well Dispersed Nanotubes

Example 1 illustrates that the present nanocomposites contain well dispersed nanotubes. Well dispersed nanotubes are indicated by the data shown in FIG. 1.

FIG. 1 shows solution phase UV-vis-near IR spectra for SWNTs dispersed in PEO by help of an anionic surfactant, LDS. The spectra for series A and series B nanocomposites (films and solutions) are shown in FIG. 1. Sharp absorbance peaks, termed van Hove singularities, are observed for polymer—SWNT solutions, as well as for the bulk nanocomposites and are good qualitative indicators of reasonably well-dispersed blends of SWNT and PEO. Thus, the presence of peaks between 400 and 1000 nm (associated with van Hove singularities) establishes a well dispersed system. While individual or small bundles of tubes exhibit van Hove singularities, large diameter ropes of tubes (i.e., poor dispersions) exhibit only monotonically decreasing absorbance with increasing wavelength.

Example 2

Geometric Percolation

Example 2 illustrates geometric percolation in the present nanocomposites. The presence of a geometric percolation threshold is indicated by the data shown in FIGS. 2, 3 and 4. Calculations estimate the geometric percolation threshold at about 0.09 wt. % nanotubes.

Figure 2:
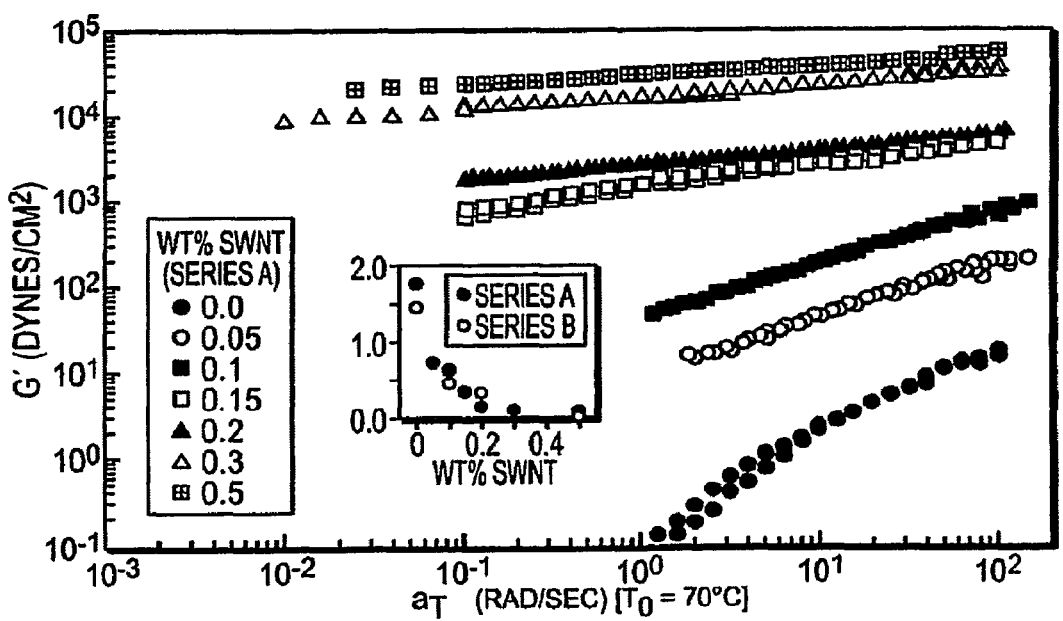
FIG. 2 shows plots of dynamic storage moduli illustrating exemplary nanocomposites exhibiting geometric percolation.

Melt rheology is a powerful technique to study the dispersion on the mesoscale. Previously, dispersion states of different fillers like anisotropic layered silicates, functionalized and pristine SWNTs, and MWNTs in different polymers have been demonstrated using this technique. FIG. 2 shows the linear dynamic oscillatory frequency dependence of the storage modulus (G') as a function of nanotube loading for the PEO nanocomposites prepared with LDS. The dynamic storage modulus (G') is compared for different wt % SWNT loading in PEO (series A). The low frequency dependence of G' for both series A and B is shown in inset. (0 wt % SWNT sample is series A pure PEO without any tube or surfactant). The pure polymer behaves like a Newtonian liquid with characteristic low frequency terminal behavior (G'$\propto\Omega^\beta$, β=2.0). The incorporation of SWNTs into this polymer results in an increase in G' at all frequencies and a decreased low frequency power-law scaling of G' (β values, shown in inset for both series). Above the percolation threshold a non-terminal frequency independent behavior of G' is observed. In fact, the low frequency moduli become independent of frequency for the higher weight fraction SWNT nanocomposites and consistent with solid-like behavior. The two molecular weight series appear virtually identical in their rheological behavior, as noted by the similarity of β values shown in the inset of FIG. 2.

Figure 3A:
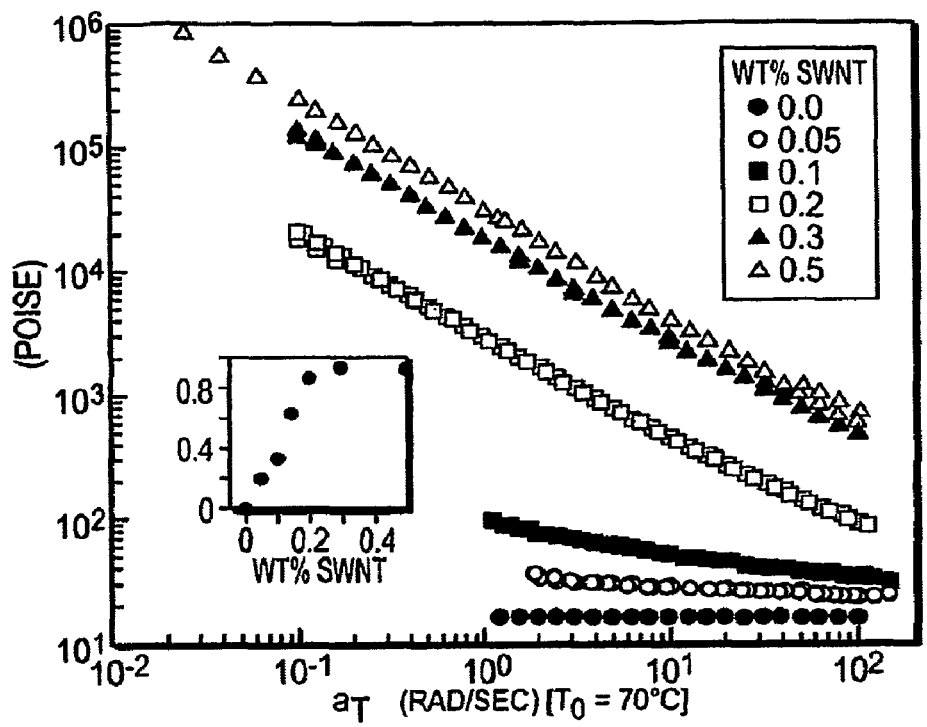
FIG. 3a shows plots of complex viscosity illustrating exemplary nanocomposites exhibiting geometric percolation.

This progression from liquid-like to solid-like behavior is attributed to the presence of a network superstructure of the nanotubes. This development of this network superstructure is also manifested in the low frequency complex viscosity, η* (FIG. 3a). FIG. 3a (left) shows the complex viscosity (η*) for pure polymer and different nanocomposites (all compatibilized using LDS). Above the geometrical percolation of the nanotubes, the nanocomposites show a divergence of viscosity at low frequency. (Inset: Low frequency power law exponent of η* (α) obtained by fitting a power law curve for five lowest frequency.)

Figure 3B:
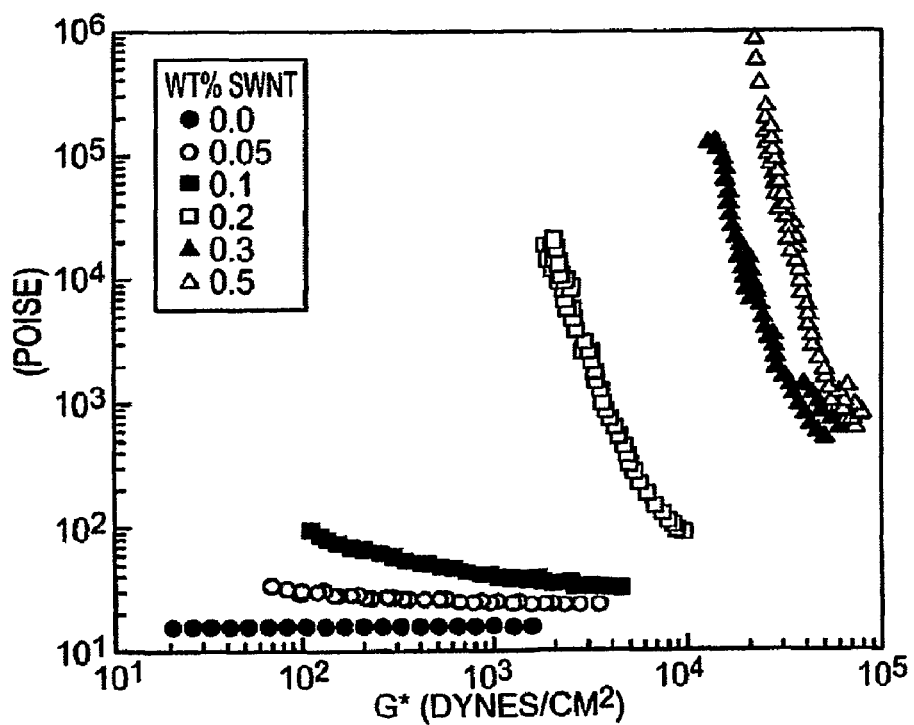
FIG. 3b shows plots of complex viscosity illustrating exemplary nanocomposites exhibiting the accompaniment of a finite yield stress with geometric percolation.

Further, η* diverge at a finite value of the complex modulus (G*) (FIG. 3b) and is consistent with the behavior of a material that exhibits a yield stress. FIG. 3b (right): geometrically-percolated nanotube structure is accompanied by the development of a finite yield stress which is demonstrated by the divergence of complex viscosity (η*) at a finite complex modulus (G*). This trend is present for all the nanocomposites with SWNT loading above the geometrical percolation threshold. On the other hand, for the nanocomposites below the hydrodynamic percolation loading, and for pure polymer, Newtonian behavior prevails.

Figure 4:
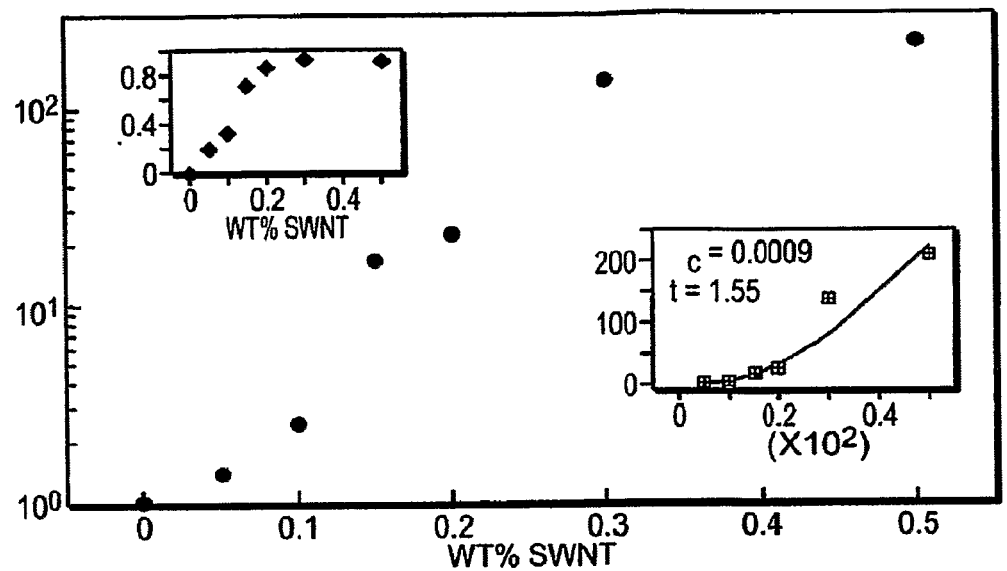
FIG. 4 shows a plot of reduced viscosity illustrating exemplary nanocomposites exhibiting geometric percolation.

Further, the transition from liquid to solid-like behavior is better visualized through FIG. 4. FIG. 4 depicts the composition dependence of the reduced viscosity ($\eta_r^*$). The reduced viscosity is defined as:

$$\eta_r^* = \frac{\eta^*}{\eta_0^*} \tag{1}$$

with $\eta_0^*$ being the zero shear viscosity of the pure polymer and η* is evaluated at a fixed frequency. In this case η* is evaluated at 10 rad/sec. The Top left inset of FIG. 4 shows a power-law exponent α for low frequency dependence of η* ($\eta^* \propto \Omega^{-\alpha}$).

The data demonstrate a sigmoidal dependence that is attributed to a changing reinforcement mechanism with increasing SWNT concentration. At low nanotube loadings, the SWNTs act as isolated objects and the viscosity (or modulus) dominated by the matrix contribution can be modeled along the lines adopted by E. Guth, J. App. Phys. 16, 20-25 (1945). The classical sigmoidal nature of the curve further the presence of a geometrical percolation of the SWNT. Beyond the geometrical percolation of the nanotubes, the SWNT network superstructure dominates the viscoelastic response and follows typical power-law-like behavior associated with systems near their percolation threshold.

At high concentrations, on the other hand, the addition of nanotubes presumably results in some aggregation of the tubes and weaker composition dependence to the reinforcement. On the basis of the above arguments, the composition dependence of the reduced viscosity at low and intermediate nanotube concentration is modeled as:

$$\eta_r = 1 + 0.67(\kappa\phi) + 1.62(\kappa\phi)^2 + m(\phi - \phi_c)^t \quad (2)$$

where $\phi$ is the SWNT volume fraction. The linear and quadratic terms result from Guth's modification of Einstein's relationship for anisotropic fillers in dilute solution and the power term is the scaling law of structural properties near percolation threshold with $\phi_c$ being the geometrical percolation threshold. The aspect ratio ($\kappa$) is related to the geometrical percolation threshold (for instance using or extrapolating the calculation of percolating ellipsoids in the absence of excluded volume by E. J. Garboczi, et al., Phys. Rev. E 52, 819-828 (1995)) and requires an iterative solution of equation 2. The Bottom right inset of FIG. 4 shows that a geometrical percolation threshold volume fraction ($\phi_c$) is obtained from plot of $\eta_r^*$ vs ($\phi - \phi_c$). In particular, a model fit of experimental data using Eq 2 (shown in inset of FIG. 4) yields a value for $\phi_c$ of $9 \times 10^4$ (~0.09 wt %, assuming a SWNT density of 1 g cm$^{-3}$), a scaling exponent (t) of 1.55, and an effective aspect ratio ($\kappa$) of 650. On the other hand, the straightforward application of the Guth equation for anisotropic fillers (i.e., eq 2 without the power term) applied to the experimental data suggests an effective aspect ratio of ~2000 and an implied geometrical percolation threshold (in the absence of excluded volume) of ~0.03 wt %.

Example 3

Conductivity and Electrical Percolation

Example 3 illustrates that the conductivity of the present nanocomposites is greater than that of the polymer. Further, Example 3 illustrates that electrical percolation may occur in the present nanocomposites, such as when the nanotubes are conducting. An increase in conductivity and the presence of an electrical percolation threshold are indicated by the data shown in FIG. 5. The low value of the threshold nanotube concentration indicates excellent dispersion.

Figure 5:
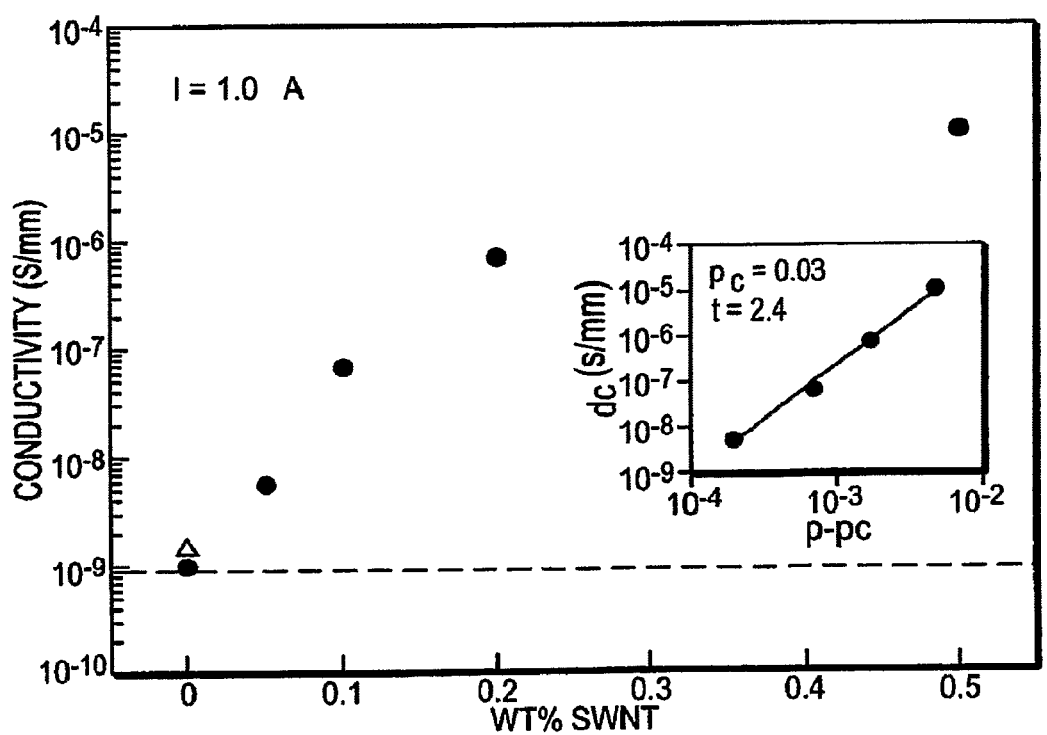
FIG. 5 shows plots of conductivity illustrating exemplary nanocomposites exhibiting electrical percolation.

The solid-state dc conductivity ($\sigma_{dc}$) at room temperature for the nanocomposites (series B) is measured as a function of SWNTs concentration (FIG. 5). In particular, FIG. 5 shows the composition dependence dc conductivity ($\sigma_{dc}$) at room temperature for PEO (series B) nanocomposites obtained using a four-point probe. Both the pure polymer (B) and the polymer with surfactant (B-L-0.2) (Δ) (with no nanotubes) are either insulating or have conductivity below the lower measurement limit of the instrument ($10^{-9}$ s/mm). The dc conductivity increases with increasing nanotube concentration and this trend follows other reports of electrical conductivity in polymer-nanotube composites. The percolation threshold ($p_c$) can be calculated using the scaling law:

$$\sigma_{dc} = m(p - p_c)_t \quad (3)$$

where p is the concentration of nanotubes, t is a universal scaling exponent and m is a constant. Thus, the electrical percolation threshold ($p_c$) as calculated from a best fit plot of σdc vs (p−$p_c$) and fitting to Eq 3 [inset]. The best fit gives a $p_c$ value of 0.03 wt % with a scaling exponent, t, of 2.4. Thus, the present inventors estimated a value of 0.03 wt % for $p_c$ and a value of 2.4 for t. The low value for $p_c$ confirms the excellent dispersion of the nanotubes in PEO. While some of the previous studies by others have shown that electrical and geometrical percolations are coincident or that the value for the electrical percolation threshold is somewhat greater than the corresponding geometrical percolation, the present inventors have observed for multiwalled nanotube—polymer composites that the connectivity (i.e., electrical) percolation precedes the rigidity (i.e., geometrical) percolation Example 4

Anionic Surfactant Compared to Cationic Surfactant

Example 4 illustrates that when the present nanocomposites contain anionic surfactants, greater dispersion is achieved than when the present nanocomposites contain cationic surfactants. A greater dispersion of nanotubes dispersed with anionic surfactants, as compared to a cationic surfactant, is indicated by the data shown in FIG. 6.

Figure 6:
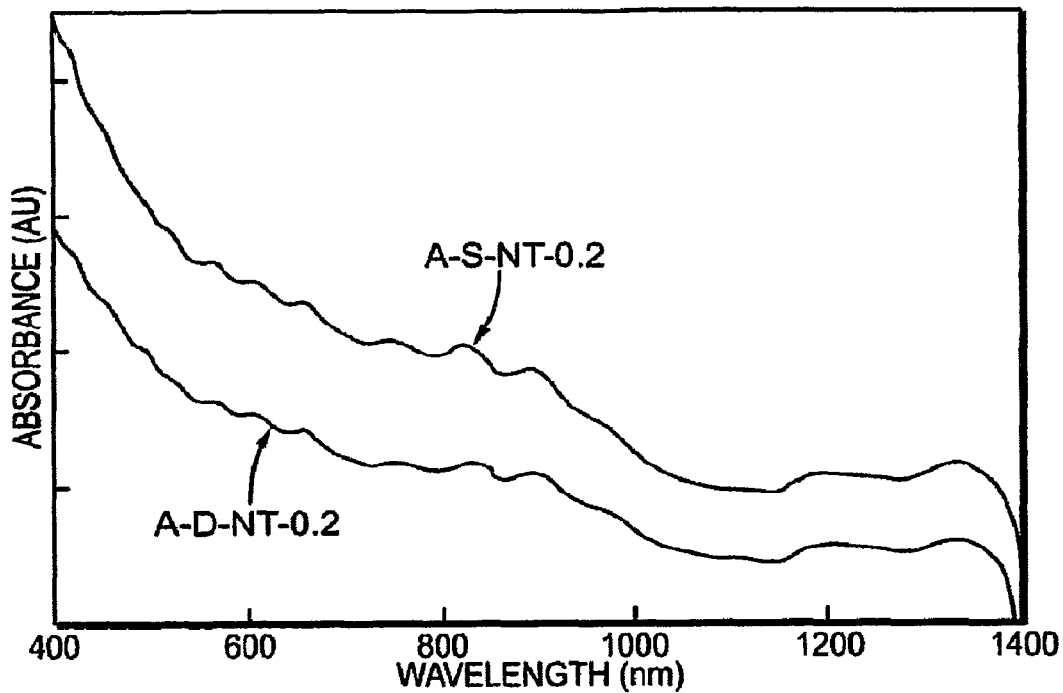
FIG. 6 shows plots of absorption spectra illustrating exemplary nanocomposites exhibiting better dispersion with an anionic surfactant than with a cationic surfactant.

To understand the role of the surfactants in SWNT dispersion in PEO, the present inventors examined comparable nanocomposites with similar nanotube loadings compatibilized using different surfactants. The surfactants (LDS, SDS and DTAB) examined all have identical alkyl chain (tail) length (C12), but have different head groups. FIG. 6 shows absorption spectra for 0.2 wt % SWNTs-PEO nanocomposites dispersed in deionized (DI) water using different types of surfactants. van Hove singularities are considerably sharper for anionic surfactant (SDS) compared to those for cationic surfactant (DTAB). From the absorption spectroscopy (i.e., the presence and sharpness of van Hove singularities, FIG. 6), the present inventors concluded that the three surfactants reasonably disperse the SWNTs, with the anionic surfactants (SDS and LDS) achieving a somewhat better solid-state dispersion.

The rheological measures of the comparison of the dispersion state for the nanocomposites prepared with the different surfactants are summarized in Table 1. The behavior of G' and $\eta^*$ at low frequencies for all the nanocomposites indicates the formation of a SWNT superstructure at 0.2 wt % SWNT. Nevertheless, the two measures of the extent of network superstructure reinforcement of the polymer: G' at a fixed Ω (10 rad/sec) and the value of $G^*|_{\eta^* \to \infty}$, indicate that the nanocomposites prepared with anionic surfactants (LDS and SDS) are significantly better dispersed than the cationic analog.

While it has been previously demonstrated that anionic, cationic and non-ionic surfactants produce well-dispersed SWNTs in water, the present inventors have discovered that better dispersion of the SWNTs in the LDS- and SDS-compatibilized system emerges from the strong interactions between PEO and those surfactants. PEO in the presence of alkali metal ions is capable of forming crown ethers that are a ring-like structure of carbon and oxygen molecules with a positive charge spread over the peripheral area and a strong negative charge developed at the center of the cavity. On the other hand, in the case of alkylammonium based cationic surfactants, a positive head-group is attached to a long alkyl tail and the imposed steric constraints render such crown ether formation unlikely.

Example 5

Nanotube Polymer Coupling

Figure 8:
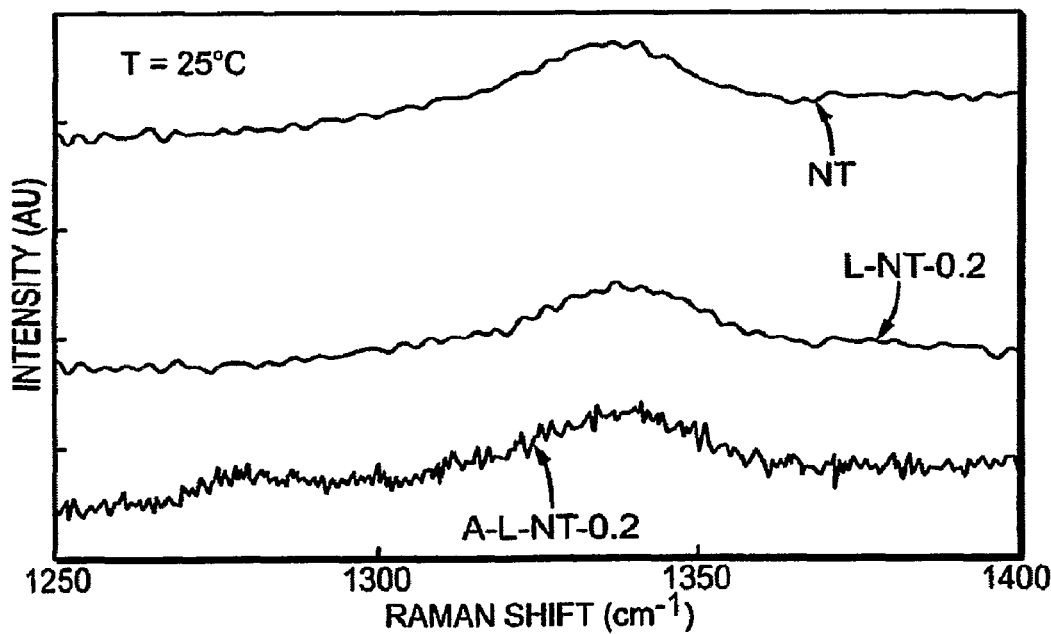
FIG. 8 shows plots of Raman spectra illustrating exemplary nanocomposites exhibiting behavior indicating an absence of chemical reaction between the surfactant and the nanotubes.
Figure 7:
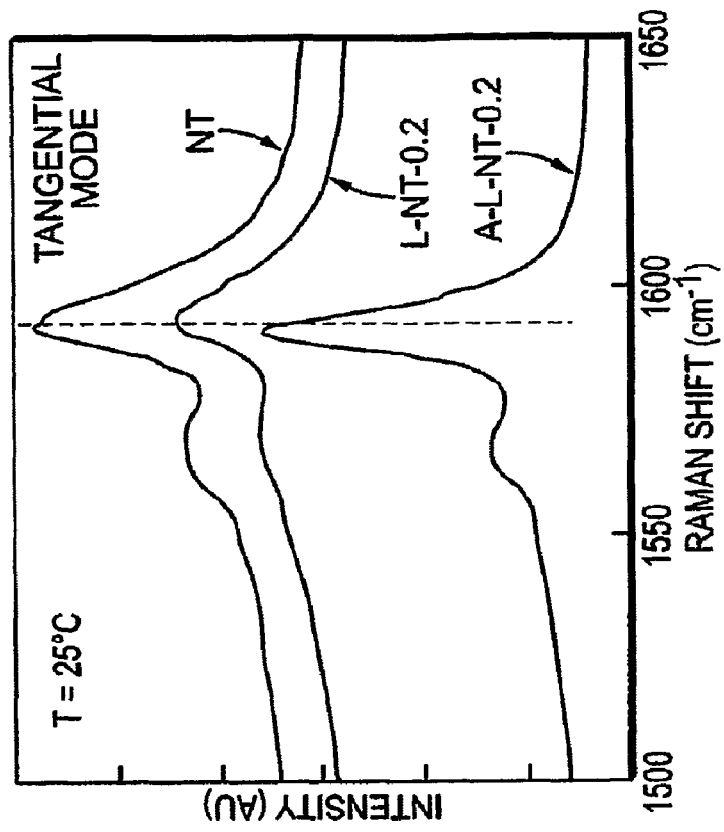
FIG. 7 shows plots of Raman spectra illustrating exemplary nanocomposites exhibiting behavior suggestive of tensile stress transfer from the polymer to the nanotubes.
Figure 7:
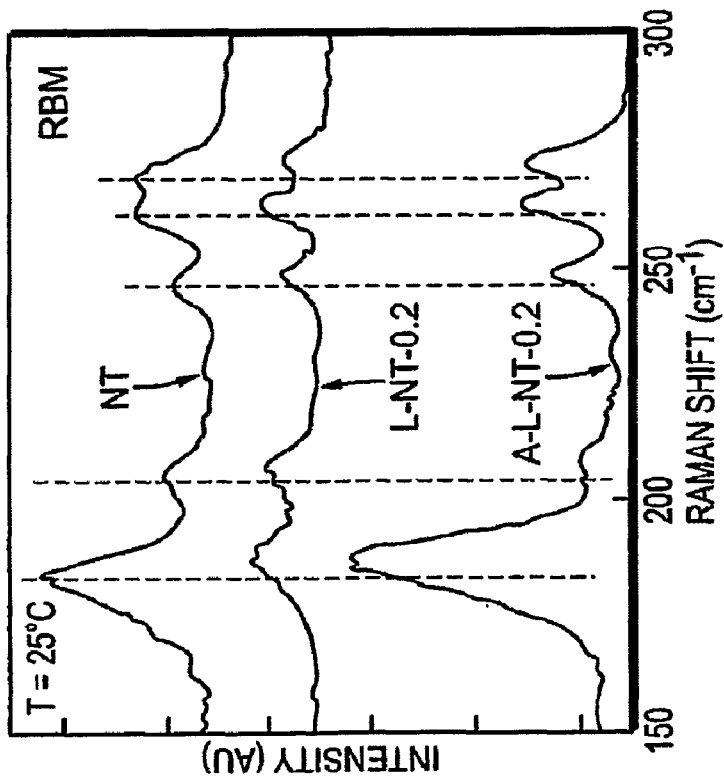

Example 5 illustrates that the present nanocomposites may demonstrate coupling between the nanotubes and the polymer matrix. FIG. 7 shows a downshift in the Raman G-modes suggestive of tensile stress transfer from the polymer to the nanotubes. FIG. 8 shows a relatively unchanged Raman D band indicating an absence of chemical reaction between the surfactant and the nanotubes, eliminating such a reaction as causing the downshift shown in FIG. 7.

Raman spectroscopy is a useful technique to investigate the nature of coupling between the tubes and polymer matrix. FIG. 7 shows the results of Raman spectroscopy of pure SWNTs and of SWNTs present in a 0.2 wt % SWNT-LDS-PEO sample with the data on the left for the radial breathing mode (RBM) and on the right for the tangential modes (G-modes). Spectra for tube-surfactant system (L-NT-0.2, only tube and LDS with surfactant amount equivalent to A-L-NT-0.2 sample) are also presented in FIG. 7 for comparison. Thus, FIG. 7 compares the Raman spectra of the nanotubes with those of the nanotubes with LDS and a polymer nanocomposite over the frequency ranges corresponding to the radial breathing mode (RBM) and tangential (G) modes of the SWNTs. While there is a significant and comparable up-shift of the RBM for the surfactant-SWNT mixtures and the nanocomposite, the present inventors observe a downshift of the highest frequency G-mode for the nanocomposite and unchanged G-modes for the LDS-SWNT mixture compared to the pure SWNT.

The changes observed for the LDS-SWNT mixtures (dried powders) compared to the pure SWNT, are a significant frequency shift in the RBM and virtually none for the G-modes, which is somewhat unusual. The addition of LDS to the SWNTs results in significant unbundling of the nanotubes, as noted by the van Hove singularities in the absorption spectra of the aqueous dispersions. Such unbundling of the tubes has been reported previously to result in either a downshift or an unchanged frequency for the RBM. However, the most convincing experimental data indicate that the individualized nanotubes have the same RBM as the nanotube bundles and thus the breakdown of the bundles by the LDS is perhaps not responsible for the observed up-shift of the RBM. Additionally, charge transfer of the Li+ to the SWNTs would result in significant changes to the G-modes, as illustrated by recent electrochemical experiments along with possible changes in intensity of the RBMs. Further, possible chemical reaction between the Li$^+$ and the SWNTs causing the upshift is ruled out by the relatively unchanged intensity of the D-band (FIG. 8) and on the basis of no changes to the RBM reported previously for Li$^+$ functionalized SWNTs. FIG. 8 shows Raman spectroscopy of pure SWNTs and of SWNTs present in 0.2 wt % SWNT-LDS-PEO sample. Relatively unchanged D band intensity indicates absence of any chemical reaction between Li$^+$ and SWNT. The slight peak observed at 1275 cm-1 for A-L-NT-0.2 sample arises from the PEO. Perhaps the most convincing argument presented for the observed upshift in the RBM is that provided by A. M. Rao et al. Phys. Rev. Lett. 86, 3895-3898 (2001) and M. J. O'Connell, et al. Phys. Rev. B, 235415-235429 (2004) that the changes in aggregation state results in different chiralities/diameters of nanotubes to be in resonance with a fixed wavelength incident laser. Similar effects to the ones reported here were also observed by the present inventors with a He—Ne (633 nm) laser, indicating that both semiconducting and metallic tubes exhibit the same phenomena.

On the other hand, for the PEO-LDS-SWNT nanocomposites, the present inventors observed that the G-band is down-shifted by ~3 cm$^{-1}$ with respect to the pure SWNT and the SWNT-LDS mixture. This frequency shift suggests tensile load transfer between the polymer and the SWNT, provided there is no charge transfer to the nanotubes. The present inventors were unable to visualize any scenario where the incorporation of a non-ionic polymer would induce a charge transfer when the mixtures of LDS-SWNT by themselves do not exhibit any charge transfer. On the other hand, the tensile load transfer between the polymer and the SWNTs, while unusual, might be consistent with the localization of the SWNTs in the amorphous liquid-like regions of the nanocomposite, as suggested by the decreased crystallinity of the PEO in the presence of the dispersed SWNTs. For SWNTs trapped in the liquid-like amorphous regions in such semi-crystalline polymer nanocomposites, unlike the case of thermoplastics or cured thermoset based nanocomposites, there is no mechanical underpinning for the SWNTs to be in compression. In fact, depending on the interactions between the SWNTs and the polymer, the nanotubes can effectively be under tension. Further, the absence of significant change in the RBM of the nanocomposite in comparison to the LDS-SWNT mixture due to the stress transfer is reconciled on the basis of a simple model calculation previously described by V. G. Hadjiev, et al. J. Chem. Phys. 122, 124708-124713 (2005), the low Poisson ratio for SWNTs (0.16-0.28) and on the relatively small changes in the G mode (~3 cm$^{-1}$). On the basis of these model calculations, that stress transfer would lead only to extremely small changes in the RBM (~0.2 cm$^{-1}$ for the 186 cm$^{-1}$ band) and outside of the accuracy of the measurements reported here.

Example 6

Melting and Crystallization

Example 6 illustrates that when the present nanocomposites contain a lithium-based surfactant they have a decreased melting temperature and a retardation of crystallization, as compared to a reference polymer without nanotubes. A decreased melting temperature and a retardation of crystallization are indicated by the data shown in FIGS. 9a and 9b.

Figure 9:
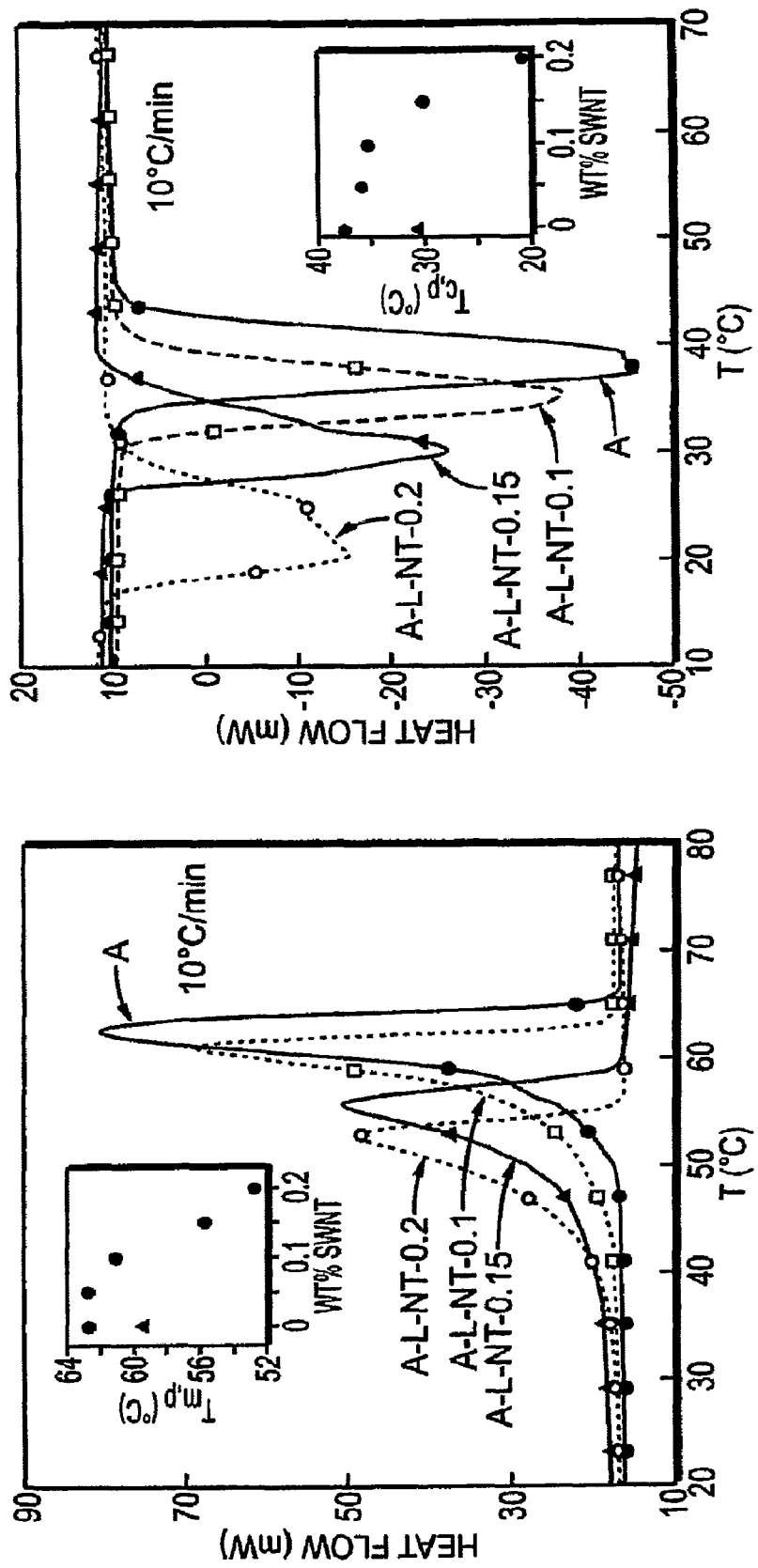
FIG. 9a shows plots of heat flow calorimetry illustrating exemplary nanocomposites exhibiting decreased melting temperature as compared to nanotube-less polymer.
FIG. 9b shows plots of heat flow calorimetry illustrating exemplary nanocomposites exhibiting retarded crystallization as compared to nanotube-less polymer.

As nanotubes are widely reported as a nucleating agent for polymer crystallization, the present inventors examined the effect of well-dispersed SWNTs on the crystallization behavior and crystal structure of PEO. DSC based heat-flow curves for non-isothermal heating and cooling show a decrease in area (i.e., decrease in fractional crystallinity) and a depression in the peak melting ($T_{m,p}$) and peak crystallization ($T_{c,p}$) temperature with increasing nanotube loading (FIGS. 9a and 9b), counter to the expected nucleating tendency of SWNTs. FIG. 9a shows melting (left) and FIG. 9b shows crystallization (right) behavior for PEO and the different nanocomposites for a constant heating (cooling) rate of 10° C./min. The inset of FIG. 9 shows non-isothermal peak melting ($T_{m,p}$) and crystallization ($T_{c,p}$) temperature for different samples and ▲-A-L-0.2 (LDS-PEO) sample.

A measure of the undercooling necessary for crystallization ($\Delta T_c = T_{m,p} - T_{c,p}$) presented in Table 2, within the errors of the measurements, is unchanged for the nanocomposites as compared to the pure polymer. This unchanged undercooling indicates that the nanotubes do not significantly affect the growth characteristics of the polymer crystals. On the other hand, the lowered values for the fractional crystallinity and $T_{m,p}$ and $T_{c,p}$ indicates a destabilization of the crystalline state and could be related to the local perturbation of the crystalline order due to the formation of the crown-ethers and a consequent decrease in the lamellar thickness of the polymer crystals. Further, while a small decrease in the fractional crystallinity and the values of $T_{m,p}$ and $T_{c,p}$ for the LDS-polymer mixture are observed, the effects were significantly larger in the case of the SWNT nanocomposites. Additionally, as previously noted SDS and DTAB are good dispersing aids for SWNTs in PEO. However, they do not cause a significant change in the melting and crystallization character of the PEO. The result for the crystallization and melting behavior of the SDS compatibilized nanocomposites is somewhat surprising, as it is anticipated that the $Na^+$ should also be able to form crown ethers with the PEO. However, it is possible that $Na^+$ based surfactant is less compatible with the SWNT (in the presence of the PEO) and results in less synergistic effect of the SWNT and the anionic surfactant.

While tubes clearly hinder the nucleation process, there is no change in the glass transition temperature ($T_g$) of nanocomposites compared to pure polymer (Table 3). The conservation of glass transition temperature indicates there is no net loss of mobility or eventually no effective change of relaxation process of the polymers in presence of tubes, but a broader distribution of $T_g$ may be interpreted as the polymer chains adjacent to tubes show a slower dynamism than chains present in polymer rich environment. Moreover, the conservation of glass transition temperature is surprising since generally SWNTs arrest the dynamic mobility of the polymer, thereby leading to an increased $T_g$.

Example 7

Extent of Crystallinity

Example 7 illustrates that when the present nanocomposites contain a lithium-based surfactant, they have a decreased crystallinity, as compared to a reference polymer without nanotubes. A decreased crystallinity is indicated by the data shown in FIG. 10.

Figure 10:
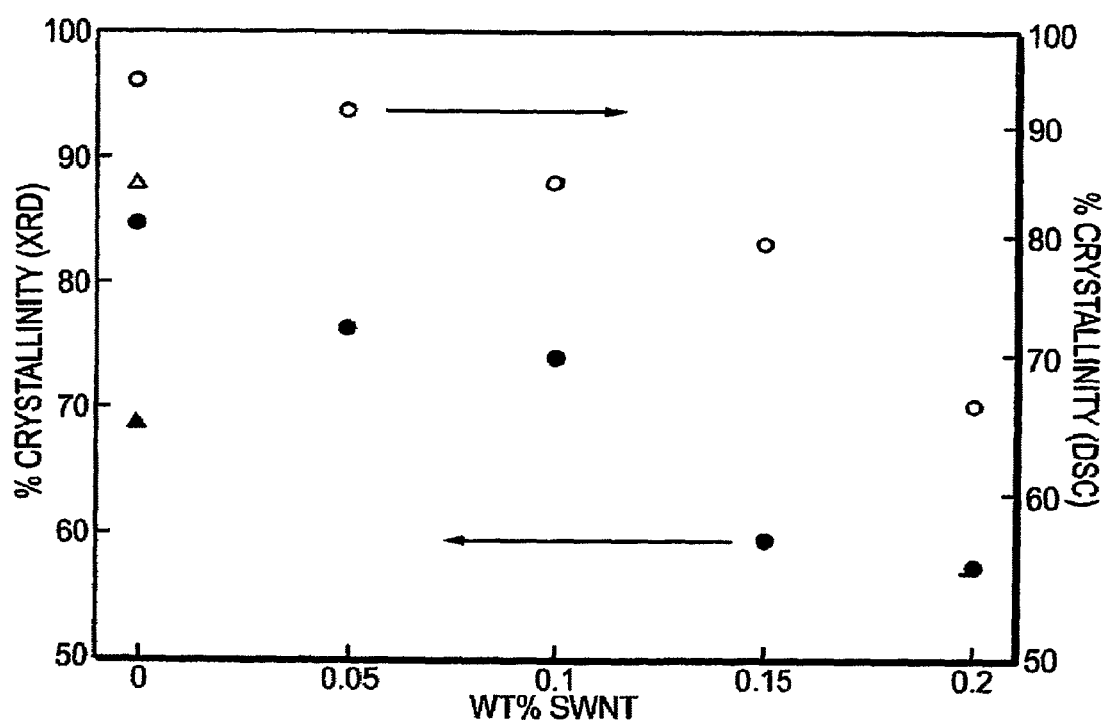
FIG. 10 shows plots of wide angle X-ray diffraction illustrating exemplary nanocomposites exhibiting decreased fractional crystallinity as compared to nanotube-less polymer.

For the LDS-PEO-SWNT mixtures, a decrease in the extent of crystallinity following isothermal crystallization was observed from wide-angle x-ray diffraction (WAXD) (FIG. 10). FIG. 10 shows a comparison of fractional crystallinity obtained from DSC and WAXD measurements for the PEO- and the PEO-based SWNT nanocomposites. The fractional crystallinity decreases dramatically with increasing SWNT concentration. The triangular symbols correspond to PEO-LDS mixture A-L-0.2. The WAXD data indicate some broadening of the crystallographic peaks, suggestive of more disorder, and no change in the unit cell structure of the PEO. Previous studies of PEO crystallization in the presence of lithium salts (such as lithium triflate or lithium (bis) trifluoromethanesulfonate imide; LiTFSI) have indicated a substantial decrease in the crystallinity and melting temperatures presumably due to the complexation of the PEO with the $Li^+$. Further, V. Kuppa and E. Manias, J. Chem. Phys. 118, 3421-3429 (2003) have demonstrated that PEO crystallization in nanocomposites with $Na^+$-montmorillonite can be substantially lowered because of both the confinement introduced by expanded silicate and possibly interactions with the metal cation in the galleries. However, substantial lowering of the melting temperature and crystallinity only occurs beyond a silicate loading of ~6 wt %. Hence our findings, while not being unique, are observed at extremely low ratios of $Li^+$ to PEO units (~1:1000) as well as at very low filler loading (~0.2 wt % SWNT). Furthermore, in contradiction to simulation results performed by Manias et al. at the same loading of nanotubes, SDS-compatibilized nanocomposites do not exhibit significant change in the crystallization behavior of PEO in these SWNT based nanocomposites. These results indicate that a substantial synergism exists for the LDS-compatibilized SWNT nanocomposites, wherein the disruption to the PEO crystallization far exceeds the effect of either the $Li^+$ or dispersed nanotubes individually or even in a simple cumulative manner. Using different analytical probes the present inventors have shown an excellent dispersion state (with effective geometrical aspect ratios of ~650 or higher) of SWNTs in PEO using a lithium-based anionic surfactant. While the melt state geometrical percolation of the nanotubes, as manifested by viscoelastic measurements, occurs at 0.09 wt % SWNT, the electrical percolation of the SWNTs at room temperature (in the semi-crystalline state of PEO) occurs at 0.03 wt %. Interestingly for these hybrids, the Raman data indicates that the tangential modes for the SWNTs are up-shifted and suggest that the SWNTs are either under tension in the nanocomposites or interacting strongly with the surfactant-polymer complex. Further, the present inventors observed a unique synergism of the $Li^+$ ions and the SWNT in substantially disturbing the ability of PEO to crystallize and demonstrate dramatic decreases in crystallinity and melting point of PEO at SWNT loadings as low as 0.2 wt %. While the unit cell structure of PEO is largely unaffected, the present inventors have observed some broadening of the crystalline peaks of PEO.

In conclusion, the present invention provides a nanocomposite containing a polymer and dispersed nanotubes, the nanocomposite having desirable properties. The nanocomposite may contain a surfactant. The present invention further provides methods of making nanocomposites that include dispersing nanotubes in a polymer matrix. The method may further include the use of a surfactant.

All patents and publications referenced herein are hereby incorporated by reference to an extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice.

It is to be understood that the invention may be practiced otherwise than as specifically described without actually departing from the spirit and scope of the present invention as defined by the appended claims.

TABLE 1

Rheological parameters for nanocomposites compatibilized with different surfactants

| SAMPLE | G'~ | ~~ | $G'\|_{-10\ rad/sec}$ (dynes/cm$^2$) | $G^*\|^*$ (dynes/cm$^2$) |
|---|---|---|---|---|
| A | 1.8 | 0.0 | 2 | — |
| A-L-NT-0.2 | 0.14 | 0.86 | 2500 | 2000 |
| A-S-NT-0.2 | 0.06 | 0.94 | 4000 | 3000 |
| A-D-NT-0.2 | 0.50 | 0.63 | 300 | 100 |

TABLE 2

Non-isothermal DSC based Melting and Crystallization Behavior

| SAMPLE | $T_{m,p}$ (° C.) | $T_{c,p}$ (° C.) | T (° C.) |
|---|---|---|---|
| A | 62.7 | 37.4 | 25.3 |
| A-L-0.2 | 59.5 | 30.8 | 28.7 |
| A-L-NT-0.05 | 62.7 | 35.8 | 26.9 |
| A-L-NT-0.1 | 61.0 | 35.2 | 25.8 |
| A-L-NT-0.15 | 55.7 | 30.0 | 25.7 |
| A-L-NT-0.2 | 52.7 | 20.5 | 32.2 |
| A-S-NT-0.2 | 61.5 | 37.9 | 23.6 |
| A-D-NT-0.2 | 62.5 | 37.0 | 25.5 |

TABLE 3

Glass transition measurement data for different nanocomposites

| SAMPLE | GLASS TRANSITION TEMPERATURE ($T_g$) (° C.) | $T_g$ WIDTH (° C.) |
|---|---|---|
| A | −64.5 | 1.6 |
| A-L-NT-0.1 | −64.7 | 1.9 |
| A-L-NT-0.2 | −64.7 | 2.1 |
| A-L-NT-0.3 | −64.5 | 1.9 |
| A-L-NT-0.5 | −64.5 | 2.7 |

What is claimed is:

1. A method of making a composite, wherein the method comprises:

adding a plurality of pristine nanotubes and a lithium-based anionic surfactant to a solvent to form a first solution;

adding a polyether to the first solution to form a second solution;

dispersing the pristine nanotubes in the polyether; and drying the second solution.

2. The method according to claim 1, wherein the polyether comprises a biocompatible polyether.

3. The method according to claim 1, wherein the polyether comprises a water soluble polyether.

4. The method according to claim 1, wherein the polyether is selected from the group consisting of polyethylene oxide and polyethylene glycol.

5. The method according to claim 1, wherein each pristine nanotube is single walled.

6. The method according to claim 1, wherein the surfactant comprises a dodecyl saturated carbon chain.

7. A method of making a composite, wherein the method comprises:

combining a plurality of pristine nanotubes with a polyether in the presence of a surfactant, wherein the surfactant comprises a lithium-based anionic surfactant; and dispersing the pristine nanotubes in the polyether.

8. The method according to claim 7, wherein the polyether comprises a biocompatible polyether.

9. The method according to claim 7, wherein the polyether comprises a water soluble polyether.

10. The method according to claim 7, wherein the polyether is selected from the group consisting of polyethylene oxide and polyethylene glycol.

11. The method according to claim 7, wherein each pristine nanotube is single walled.

12. The method according to claim 7, wherein the surfactant comprises a dodecyl saturated carbon chain.

* * * * *